UNITED STATES PATENT OFFICE.

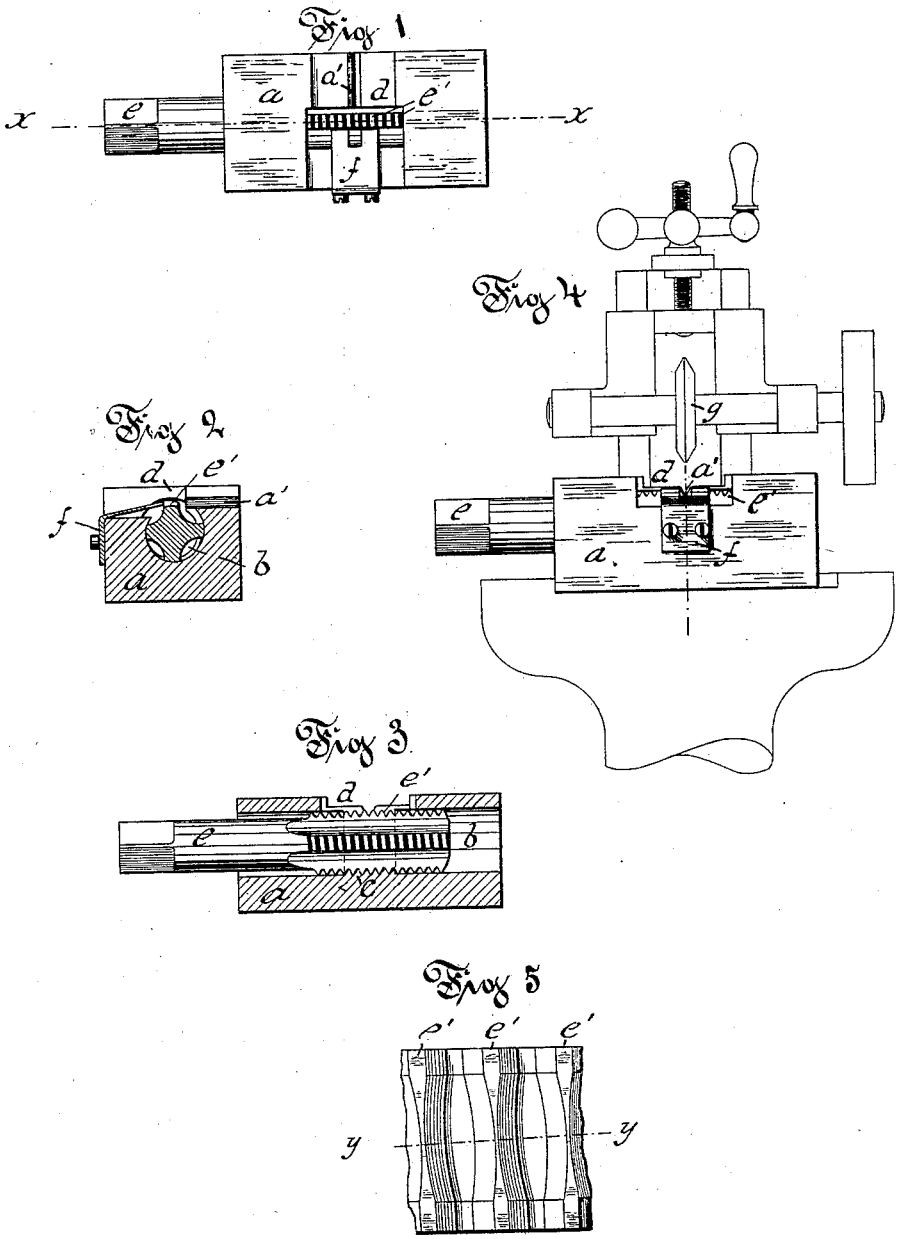

JAMES E. WOODBRIDGE, OF HARTFORD, CONNECTICUT.

SCREW-THREADING TAP.

SPECIFICATION forming part of Letters Patent No. 318,071, dated May 19, 1885.

Application filed March 6, 1883. (No model.)

*To all whom it may concern:*

Be it known that I, JAMES E. WOODBRIDGE, of Hartford, in the county of Hartford and State of Connecticut, have invented certain new and useful Improvements in Screw-Taps, of which the following is a description, reference being had to the accompanying drawings, where—

Figure 1 is a top view of my improved holder or guide. Fig. 2 is a view of same in central cross-section. Fig. 3 is a view of same in central longitudinal section on line $x\ x$, Fig. 1, and showing my improved tap in side view. Fig. 4 is a front view of my device as held in an ordinary milling-machine, part of which is shown in light outline. Fig. 5 is a view, on enlarged scale, of a part of a tap showing three teeth in plan view and also in cross-section.

In the following description I shall use the term "clearance" when applied to the tap as restricted to meaning the difference, radially, of the tap between the front edge of a tooth and the back edge of the same, and the word "relief" is limited in meaning so as to apply only to the difference between the width of the cutting-face of the tooth and the thickness of the same tooth some distance back of the cutting-face, these latter measurements being taken lengthwise of the tap.

In using the ordinary fluted tap, which has no relief, the cutting-edges of each tooth become dull after a very short use, and by failing to cut freely cause the tap to rub and bind on the angular sides of the thread to such an extent that the tap is often broken, and in any event rendered useless. To overcome this difficulty many experiments have been tried prior to my invention. Each tooth has been relieved by tapering, so as to make the tooth thinner through the back than through the cutting-face. This method is imperfect and a failure because it weakens the cutting-edge, and also prevents the teeth from breaking off the chips usually broken by reversing the rotary motion of the tap. A more serious defect is that it does not leave bearings enough for the thread to steady the tap so that it will cut a thread of uniform pitch or width of thread, it being well known that the teeth of the tap must have a considerable length and fullness to insure accurate bearing and finished work. Another way that has been tried consisted in cutting a narrow flute through the land; but this method gives clearance for the top of the thread, and, gradually running off to nothing at the bottom, makes the teeth weak. Other methods have been tried with but little or no degree of success in effecting the desired object. Each cutting-tooth of the tap must have sufficient length and thickness for that length to afford such bearing as will insure the cutting of a thread uniform as to pitch and depth.

The within-described process of relieving a tap consists in cutting away the inner and opposite faces of the adjacent teeth of a tap by means of a rotating cutter having a V-shaped cutting-edge, the cutter being moved toward and from the tap while relieving it in a line that passes through the axis of the tap and the center of the rotating cutter. The tap is supported in a threaded guide in such manner that the thread already cut in the tap serves the purpose of a leading-screw to determine the degree of advancement of the tap, which is made in successive steps past the cutter, which moves toward and from the tap in a fixed plane through which the tap advances.

My improvement consists in a tap having teeth of full width, front and back, and concave sides, whereby the tap is relieved.

In the accompanying drawings, the letter $a$ denotes a metallic holder or guide having, in the form shown, a perforation, $b$, with a thread, $c$, and an opening, $d$, in the holder, so made as to give the cutter $g$ access to the teeth $c'$ of the tap $e$, as these teeth are successively brought to the upper side of the holder.

The tap $e$, when ready to be relieved, is of ordinary material and construction, the one illustrated having four flutes and a like number of lands, in which latter the teeth $c'$ are cut.

In the operation of relieving the tap it is inserted in the holder, to one side of which the spring-stop $f$ is secured. This stop projects into the opening $d$ in the holder and takes against the side of the land at the back of the teeth, so as to hold the tap from turning back under the rotary cutter $g$, which is borne on a spindle in a reciprocating frame that moves in a plane directly over the groove $a'$ on the guide.

In Fig. 4 the holder is shown secured, as by wedging, in a seat on a machine of simple form, in which the cutter $g$ is borne on a spindle driven by a belt moving on the pulley fast to the right-hand end of the cutter-spindle.

The frame or head bearing the cutter-spindle is adapted to be moved up and down in a vertical plane by means of the vertical screw-spindle attached to the head and passing through a rotary nut attached to the main frame of the machine, only the parts that are immediately appurtenant to my invention being shown.

A handle attached to an arm fast to the nut enables a workman to reciprocate the cutter to and from the tap holder or guide at will.

In operating this machine for the purpose described the tap is rotated one quarter turn (in the four-fluted form of tap shown) at each step and then held, as by stop $f$, while the cutter advances, cuts the faces of the threads between the teeth, and is then withdrawn to return and cut the next series presented by the turn of the tap. When the faces of the teeth are thus being cut, the bottom of the groove between the teeth is also hollowed out by the periphery of the cutter.

It is obvious that the interior thread of the guide must be the counterpart of the special size of taps operated upon, and that different sizes of holders are required for the different sizes of taps.

I claim as my invention—

As an improved article of manufacture, a tap having its teeth formed of full width, front and back, and with concave sides, all substantially as described.

JAMES E. WOODBRIDGE.

Witnesses:
 CHAS. L. BURDETT,
 W. H. MARSH.